(No Model.)
F. W. DENHARD.
SAW SET.
No. 568,084. Patented Sept. 22, 1896.
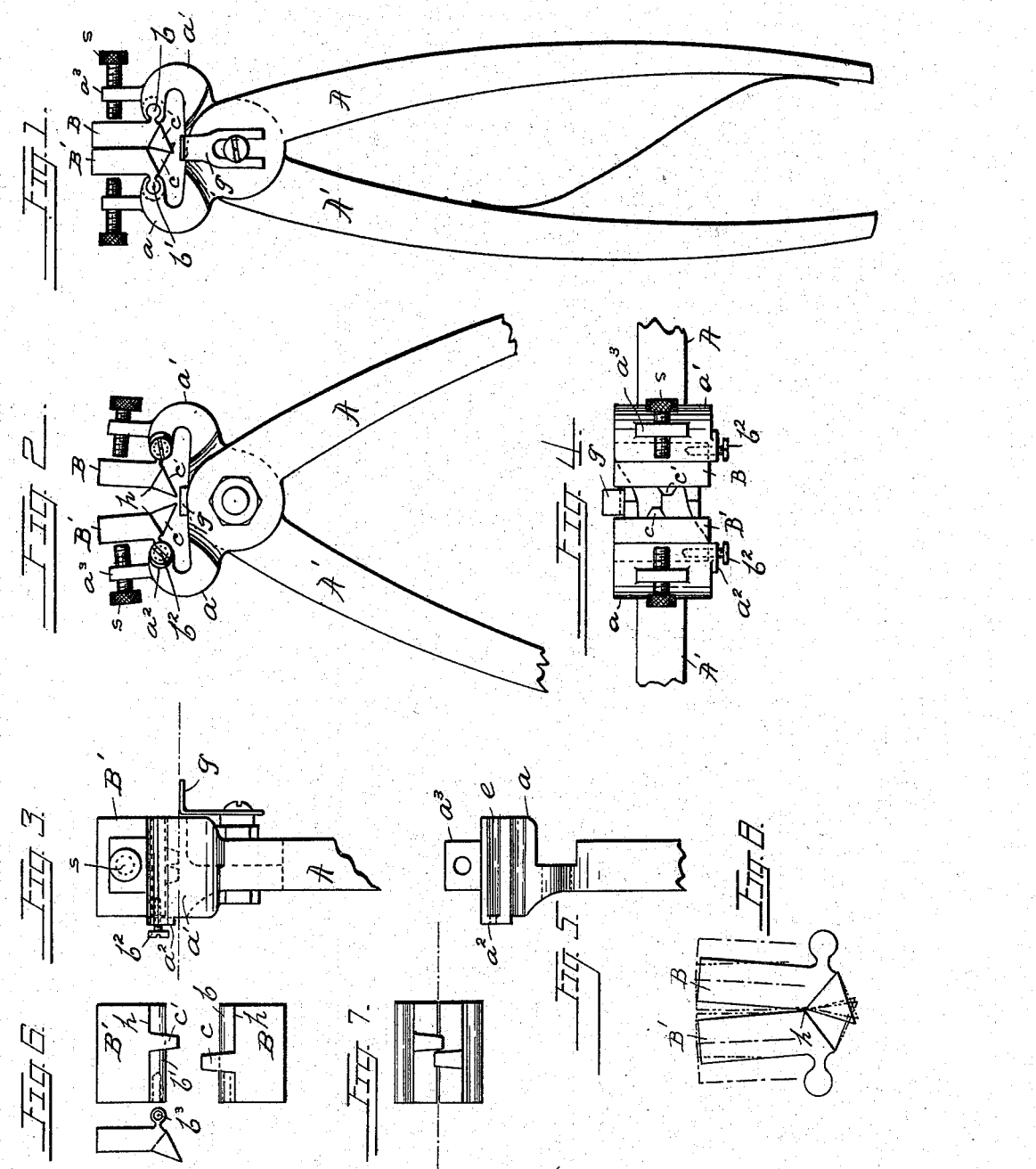
Witnesses
Carrie Kelly
Florence Kelly
Frederick W. Denhard, Inventor
By Attorney Ed. A. Kelly

UNITED STATES PATENT OFFICE.

FREDERICK W. DENHARD, OF READING, PENNSYLVANIA.

SAW-SET.

SPECIFICATION forming part of Letters Patent No. 568,084, dated September 22, 1896.

Application filed June 30, 1896. Serial No. 597,553. (No model.)

*To all whom it may concern:*

Be it known that I, FREDERICK W. DENHARD, a citizen of the United States, residing at Reading, in the county of Berks and State of Pennsylvania, have invented certain new and useful Improvements in Saw-Sets; and I do hereby declare the following to be a full, clear, and exact description of the invention, such as will enable others skilled in the art to which it appertains to make and use the same.

This invention relates to improvements in saw-sets, and is intended as an improvement on saw-sets heretofore made, in which a punch or hammer was actuated by the hand-lever and in which one tooth was set at each operation.

The invention is fully described in the following specification and clearly shown in the accompanying drawings, in which—

Figure 1 is an elevation of my improved saw-set with the jaws closed. Fig. 2 is a similar view with the jaws open to receive the blade of a saw. Fig. 3 is a side view, and Fig. 4 a top view, of Fig. 2. Fig. 5 shows the upper end of one of the jaws with the block or anvil removed. Fig. 6 shows the blocks or anvils in several views. Fig. 7 is a bottom view of the two blocks, showing how they meet. Fig. 8 illustrates the movement of the blocks in the operation of setting the teeth of a saw.

The machine is made in the form of a pair of pincers, of which A A' are the hand-levers and $a$ $a'$ the jaws. These jaws are provided with lateral grooves $e$ in their ends to receive the cylinders $b$ $b'$ near the lower ends of the blocks B B'. These cylinders enter the cylindrical grooves $e$ until they butt against the caps $a^2$ at the other ends thereof, and adjusting-screws $b^2$, passing through the caps, enter the cylinders at $b^3$ and serve to adjust them in the said grooves, laterally. On the top of each jaw I provide a lug $a^3$, through which passes a set-screw $s$ for adjusting the blocks in their rocking movement in the grooves. These blocks are provided with depending lips $c$ $c'$, which, when the jaws are closed, will just pass each other, Fig. 7. A gage $g$, on which the saw-blade rests, is adjustably attached to the side of the machine.

When it is desired to set the teeth of a saw, the blade thereof is entered between the blocks until it rests upon or against the gage $g$, Fig. 3. This will bring the teeth in position to be operated upon, the blocks being set so as to have the proper amount of movement by means of the set-screws $s$. The pressure of the hand-lever will cause the blocks to clamp the blade of the saw firmly, and continued pressure will cause them to rock on the points $h$ and the lips $c$ $c'$ to cross each other, each carrying with it one of the teeth in opposite directions. The blocks hold the blade of the saw firmly and the act of setting the teeth will not cause the blade to bend, as the pressure is the same on either side. This operation is continued until the whole length of the blade has been traversed, and it will be seen that as two adjacent teeth are set at each operation it requires but one pass along the saw to complete the setting of all the teeth.

By means of the screws $b^2$ the blocks can be adjusted laterally to take large or small teeth, as the case may be, and when it is desired to remove the blocks for any purpose the screw $b^2$ is withdrawn entirely and the block can be easily removed from the other side of the jaw.

In Fig. 8 I show the action of the blocks B B' in the different stages of the operation, the full lines showing the final position after it has set the teeth.

Having thus fully described my invention and its manner of operation, what I claim, and desire to secure by Letters Patent, is—

1. In a saw-set the combination of the jaws and hand-levers with the blocks or anvils B B' provided with lips $c$ $c'$ and cylinders $b$ $b'$ adapted to rock in the grooved ends of the jaws, and set-screws $s$ to limit said rocking movement, said blocks adapted to firmly hold the blade of a saw and set two adjacent teeth thereof in opposite directions at one operation by the closing of said jaws, substantially as set forth.

2. In a saw-set the combination of the jaws having adjustable blocks B B' rocking therein, set-screws $b^2$, lugs $a^3$, and set-screws $s$, said blocks provided with lips $c$ $c'$ for setting two adjacent teeth of a saw in opposite directions at one operation of said jaws, and a gage $g$ for gaging the depth of set, all substantially as and for the purpose set forth.

In testimony whereof I affix my signature in presence of two witnesses.

FREDERICK W. DENHARD.

Witnesses:
ED. A. KELLY,
LEW. S. LEVAN.